(12) United States Patent
Ryou et al.

(10) Patent No.: US 9,373,874 B2
(45) Date of Patent: Jun. 21, 2016

(54) METAL AIR CELL CHARGING APPARATUS, METAL-AIR CELL ASSEMBLY, AND METAL-AIR CELL CHARGING SYSTEM COMPRISING THE SAME

(75) Inventors: Byung Hoon Ryou, Seoul (KR); Jae Kyung Kong, Seoul (KR)

(73) Assignee: E.M.W. ENERGY CO., LTD., Seoul (KR)

( * ) Notice: Subject to any disclaimer, the term of this patent is extended or adjusted under 35 U.S.C. 154(b) by 1044 days.

(21) Appl. No.: 13/500,908

(22) PCT Filed: Oct. 4, 2010

(86) PCT No.: PCT/KR2010/006746
§ 371 (c)(1),
(2), (4) Date: Apr. 7, 2012

(87) PCT Pub. No.: WO2011/043565
PCT Pub. Date: Apr. 14, 2011

(65) Prior Publication Data
US 2012/0200253 A1    Aug. 9, 2012

(30) Foreign Application Priority Data
Oct. 7, 2009  (KR) .......................... 10-2009-0095064

(51) Int. Cl.
*H01M 12/08*    (2006.01)
*H01M 2/02*    (2006.01)
(Continued)

(52) U.S. Cl.
CPC ............ *H01M 12/08* (2013.01); *H01M 2/0255* (2013.01); *H01M 10/46* (2013.01); *H01M 2004/023* (2013.01)

(58) Field of Classification Search
CPC ....... Y02E 60/50; Y02E 60/124; Y02E 60/36; H01M 4/02; H01M 4/86; H01M 10/24
See application file for complete search history.

(56) References Cited

U.S. PATENT DOCUMENTS 5,560,999 A * 10/1996 Pedicini .............. H01M 10/613
429/407
6,312,844 B1  11/2001 Faris
(Continued)

FOREIGN PATENT DOCUMENTS

CN    1280712 A    1/2001
CN    1338125 A    2/2002
(Continued)

OTHER PUBLICATIONS

International Search Report for PCT/KR2010/006746.
(Continued)

*Primary Examiner* — Mark F Huff
*Assistant Examiner* — Monique Wills
(74) *Attorney, Agent, or Firm* — The PL Law Group, PLLC (57) ABSTRACT

A metal-air cell recharge apparatus, a metal-air cell assembly and a metal-air cell recharge system including the same are provided. The metal-air cell recharge apparatus for recharging a metal-air cell assembly including a secondary metal-air cell containing anode gel and a case accommodating the secondary metal-air cell therein, the apparatus includes a recharge unit for generating supply power using an external power source, and supplying the metal-air cell assembly with the supply power; and a humidified-air supply unit for generating humidified air containing a certain amount of moisture and supplying the humidified air inside the case through a humidified-air supply hole connected to the metal-air cell assembly.

11 Claims, 4 Drawing Sheets

(51) Int. Cl.
*H01M 10/46* (2006.01)
*H01M 4/02* (2006.01)

(56) References Cited

U.S. PATENT DOCUMENTS

| | | | |
|---|---|---|---|
| 2002/0132161 A1* | 9/2002 | Kelsey et al. | 429/82 |
| 2008/0193851 A1* | 8/2008 | Armacanqui et al. | 429/300 |
| 2015/0010833 A1* | 1/2015 | Amendola et al. | 429/406 |

FOREIGN PATENT DOCUMENTS

| | | | |
|---|---|---|---|
| CN | 1581567 A | | 2/2005 |
| JP | 08-511896 A | | 12/1996 |
| JP | 09-298066 A | | 11/1997 |
| JP | 11-514137 A | | 11/1999 |
| JP | 2000-133328 A | | 5/2000 |
| JP | 2001-176564 A | | 6/2001 |
| JP | 2001-266961 A | | 9/2001 |
| JP | 2003-521796 A | | 7/2003 |
| KR | 10-2001-0030968 A | | 4/2001 |
| KR | 10-2004-0047856 A | | 6/2004 |
| WO | 94/25991 A2 | | 11/1994 |
| WO | 97/44848 A1 | | 11/1997 |
| WO | 03/041211 A2 | | 5/2003 |

OTHER PUBLICATIONS

English Abstract of KR10-2001-0030968.
English Abstract of KR10-2004-0047856.
European Search Report dated Jan. 22, 2014 in a counterpart European application EP10822210.
Office action from Chinese Intellectual Property Office (SIPO) in a counterpart Chinese Patent Application No. 20108041310.8 issued on Dec. 20, 2013.
Communication from Japanese Patent Office (JPO) in a counterpart Japanese Patent Application No. 2012-530790.

* cited by examiner

| Degree of hardness | Amount of incoming current corresponding to degree of hardness (mAh) | Humidity corresponding to degree of hardness |
|---|---|---|
| 0 | 800 | 0 |
| 0.1 | 750 | 10 |
| 0.2 | 700 | 15 |
| 0.3 | 650 | 20 |
| ... | ... | ... |

METAL AIR CELL CHARGING APPARATUS, METAL-AIR CELL ASSEMBLY, AND METAL-AIR CELL CHARGING SYSTEM COMPRISING THE SAME

CROSS REFERENCE TO RELATED APPLICATIONS AND CLAIM OF PRIORITY

This patent application is a National Phase application under 35 U.S.C. §371 of International Application No. PCT/KR2010/006746, filed on Oct. 4, 2010, entitled METAL-AIR CELL CHARGING APPARATUS, METAL-AIR CELL ASSEMBLY, AND METAL-AIR CELL CHARGING SYSTEM COMPRISING THE SAME, which claims priority to Korean Patent Application number 10-2009-0095064, filed 7 Oct. 2009, entire contents of which are incorporated herein by reference.

TECHNICAL FIELD

The present invention relates to a metal-air cell recharge apparatus, a metal-air cell assembly and a metal-air cell recharge system including the same. More specifically, a metal-air cell recharge apparatus for electrically recharging a secondary metal-air cell, which is a rechargeable metal-air cell, if the secondary metal-air cell is discharged, a metal-air cell assembly including the secondary metal-air cell recharged by the metal-air cell recharge apparatus, and a metal-air cell recharge system including the metal-air cell recharge apparatus and the metal-air cell assembly.

BACKGROUND

An electrochemical power source is an apparatus for generating electrical energy by electrochemical reaction. This apparatus includes a metal-air cell such as a zinc-air cell or an aluminum-air cell. The metal-air cell employs an anode constructed using a metal transformed into a metal oxide while discharging, and an air cathode membrane, i.e., a permeable membrane containing water molecules, which generates hydroxyl ions by contacting with oxygen in the air is employed as a cathode.

Such a metal-air cell has a lot of advantages compared with conventional hydrogen fuel cells. Particularly, since fuels such as zinc may exist abundantly as a metal or a metal oxide, it is advantageous in that the energies supplied by the metal-air cell are not visibly drained. In addition, while the conventional hydrogen fuel cells are required to be refilled, the metal-air cell may be used by electrically recharging the cell, and the metal-air cell may deliver an output voltage (1 to 4.5 Volts) higher than those of conventional fuel cells (<0.8V).

Figure 1:
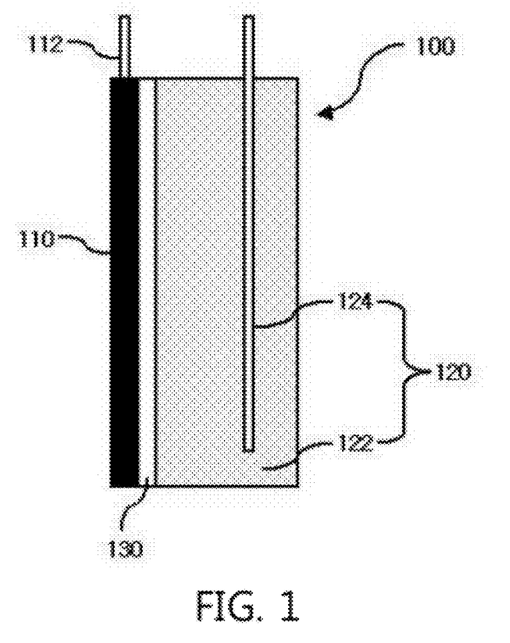
FIG. 1 is a view briefly showing the configuration of a secondary metal-air cell.

FIG. 1 is a view showing a secondary metal-air cell 100 including a cathode 110 containing a cathode current collector 112 and formed along the inner surface, an anode 120 containing anode gel 122, i.e., a mixture of a zinc metal and an electrolyte, and an anode current collector 124, and a separator 130 which separates the cathode 110 and the anode 120. Here, the air cathode membrane described above may be used as the cathode 110.

The secondary metal-air cell 100 described above supplies power to a load, i.e., discharges, through the cathode current collector 112 contained in the cathode 110 and the anode current collector 124 contained in the anode 120.

Describing in further detail, oxygen supplied through the air or other power source is used as a reactant for the cathode 110 of the secondary metal-air cell 100. When the oxygen arrives at a reactive site in the cathode 110, the oxygen is transformed into hydroxyl ions together with water. Such a reaction can be expressed as a chemical formula shown below.

[Chemical formula 1]

At the same time, electrons are released so as to flow as electricity in an external circuit. The hydroxyl ions move to the anode 120 containing the anode gel 122. When the hydroxyl ions arrive at the anode 120, zinc hydroxide is formed on the surface of the anode 120. The zinc hydroxide is decomposed into zinc oxide and discharges water to be alkaline solution. Such a reaction can be expressed as a chemical formula shown below.

[Chemical formula 2]

By the reaction described above, the secondary metal-air cell 100 discharges and supplies electrical energy to the outside. Then, if the secondary metal-air cell 100 reaches a discharge limit and stops supplying electrical energy to the outside, the secondary metal-air cell 100 can be reused by electrically recharging the secondary metal-air cell 100 using the cathode current collector 112 and the anode current collector 124.

However, if the secondary metal-air cell 100 described above is repeatedly discharged and recharged, moisture in the anode gel 122 contained in the anode 120 decreases, and thus the anode gel 122, i.e., a mixture of an electrolyte and a zinc metal, is hardened. Therefore, the secondary metal-air cell 100 cannot be reused.

Furthermore, there is a problem in that the number of discharges and recharges of the secondary metal-air cell 100 until the anode gel 122 is hardened is smaller than those of existing rechargeable batteries such as Nickel-Metal Hydride rechargeable batteries, lithium ion rechargeable batteries, and the like. That is, the lifespan of the secondary metal-air cell 100 is shorter than those of the existing rechargeable batteries.

SUMMARY

Therefore, the present invention has been made in view of the above problems, and it is an object of the present invention to provide a metal-air cell recharge apparatus for recharging a secondary metal-air cell by supplying the secondary metal-air cell with power and simultaneously preventing hardening of anode gel contained in the secondary metal-air cell by supplying the secondary metal-air cell with air containing a certain amount of moisture. The present invention also provides a metal-air cell assembly including the secondary metal-air cell and being provided with the power and the humidified air containing a certain amount of moisture from the metal-air cell recharge apparatus, and a metal-air cell recharge system including the metal-air cell recharge apparatus and the metal-air cell assembly.

To accomplish the above object, according to one aspect of the present invention, there is provided a metal-air cell recharge apparatus for recharging a metal-air cell assembly including a secondary metal-air cell containing anode gel and a case accommodating the secondary metal-air cell therein, the apparatus comprising: a recharge unit for generating supply power supplied to the metal-air cell assembly using an external power source, and supplying the metal-air cell assembly with the supply power; and a humidified-air supply unit for generating humidified air containing a certain amount of moisture and supplying the humidified air inside the case through a humidified-air supply hole connected to the metal-air cell assembly.

The metal-air cell recharge apparatus may further comprise a switch capable of selectively operating either or both of the recharge unit and the humidified-air supply unit.

The humidified-air supply unit may include: a water tank for storing water needed for generating the humidified air; and a humidified-air generation and exhaustion unit for generating the humidified air using the water supplied from the water tank and exhausting the humidified air through the humidified-air supply hole.

The humidified-air supply unit may further include: a humidity control unit for controlling humidity of the humidified air generated by the humidified-air generation and exhaustion unit depending on a degree of hardness of the anode gel.

The humidity control unit may store humidity control data including information on an amount of incoming current corresponding to a degree of hardness of the anode gel and information on humidity corresponding to the degree of hardness.

The humidity control unit may acquire an amount of supply current supplied by the recharge unit to the metal-air cell assembly, from the recharge unit, extract specific humidity control data corresponding to the amount of supply current from the humidity control data, and control humidity of the humidified air generated by the humidified-air generation and exhaustion unit using the information on humidity included in the specific humidity control data.

According to another aspect of the present invention, there is provided a metal-air cell assembly including a secondary metal-air cell containing anode gel, a cathode current collector and an anode current collector, the assembly comprising: a case shaping an appearance of the metal-air cell assembly, having an accommodation space for accommodating the secondary metal-air cell therein, forming an inlet on one side, and forming an outlet on the other side; and a power receive and feed unit for supplying an external load with discharge power outputted through the cathode current collector and the anode current collector, and receiving supply power for recharging the secondary metal-air cell from a metal-air cell recharge apparatus and delivering the supply power to the cathode current collector and the anode current collector.

The case may include an inlet cover for opening and closing the inlet and an outlet cover for opening and closing the outlet.

The case may accommodate one or more secondary metal-air cells.

The power receive and feed unit may have connectors or terminals, one ends of which are respectively connected to the cathode current collector and the anode current collector, and the other ends of which are electrically connected to the external load or the metal-air cell recharge apparatus.

According to still another aspect of the present invention, there is provided a metal-air cell recharge system comprising: a metal-air cell assembly including: a secondary metal-air cell having anode gel, a cathode current collector and an anode current collector; a case having an accommodation space for accommodating the secondary metal-air cell therein, forming an inlet on one side, and forming an outlet on the other side; and a power receive and feed unit for supplying an external load with discharge power outputted through the cathode current collector and the anode current collector and delivering supply power for recharging the secondary metal-air cell to the cathode current collector and the anode current collector; and a metal-air cell recharge apparatus including: a recharge unit for generating the supply power and supplying the metal-air cell assembly with the supply power; and a humidified-air supply unit for generating humidified air containing a certain amount of moisture and supplying the inlet with the humidified air through a humidified-air supply hole.

The metal-air cell recharge system may further comprise: a switch capable of selectively operating either or both of the recharge unit and the humidified-air supply unit.

According to the present invention, when the secondary metal-air cell included in the metal-air cell assembly is recharged by the metal-air cell recharge apparatus, humidified air containing a certain amount of moisture is supplied to the metal-air cell assembly, and the anode gel of the secondary metal-air cell may absorb the moisture contained in the humidified air. Therefore, hardening of the anode gel caused by repetitive use of the secondary metal-air cell may be delayed or prevented.

DETAILED DESCRIPTION

In the following detailed description, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numbers refer to the same or similar functionality throughout the several views.

The preferred embodiments of the present invention will be hereafter described in detail, with reference to the accompanying drawings so that those skilled in the art may easily embody the present invention.

Figure 2:
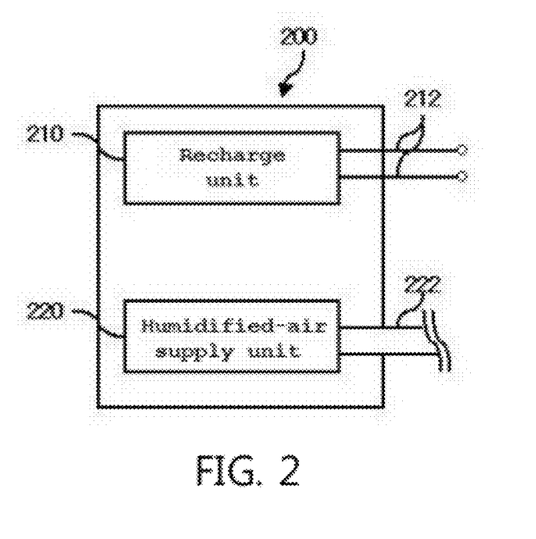
FIG. 2 is a block diagram briefly showing the configuration of a metal-air cell recharge apparatus according to an embodiment of the present invention.

FIG. 2 is a block diagram briefly showing the configuration of a metal-air cell recharge apparatus according to an embodiment of the present invention.

The metal-air cell recharge apparatus 200 according to an embodiment of the present invention includes a recharge unit 210 and a humidified-air supply unit 220.

The recharge unit 210 generates supply power that will be supplied to a metal-air cell assembly 600 using an external power source and supplies the metal-air cell assembly 600 with the supply power through power supply lines 212. The metal-air cell assembly 600 includes a secondary metal-air cell 100 containing anode gel and a case 610 for accommodating the secondary metal-air cell 100 therein. In other words, the recharge unit 210 recharges the secondary metal-air cell 100 included in the metal-air cell assembly 600.

Although it is not shown in FIG. 2, the recharge unit 210 may include a connector connected to the external power source, an adapter for converting alternating current (AC) power inputted through the connector into direct current (DC) power, a regulator for maintaining the DC power outputted from the adapter to be constant, and a recharge drive circuit for receiving the DC power from the regulator, converting the DC power into the supply power, and outputting the supply power.

The humidified-air supply unit 220 according to an embodiment of the present invention generates humidified air containing a certain amount of moisture and supplies the metal-air cell assembly 600 with the humidified air through a humidified-air supply hole 222. Here, when the secondary metal-air cell 100 included in the metal-air cell assembly 600 is recharged, the humidified-air supply unit 220 preferably supplies the metal-air cell assembly 600 with the humidified air, i.e., operates in parallel to the recharge unit 210. However, the present invention is not necessarily limited thereto, but the humidified-air supply unit 220 may operate independently without connection to the operation of the recharge unit 210.

If the humidified-air supply unit 220 operates independently without connection to the operation of the recharge unit 210, the metal-air cell recharge apparatus 200 preferably further includes a switch (not shown) that can selectively operate either or both of the recharge unit 210 and the humidified-air supply unit 220.

Figure 3:
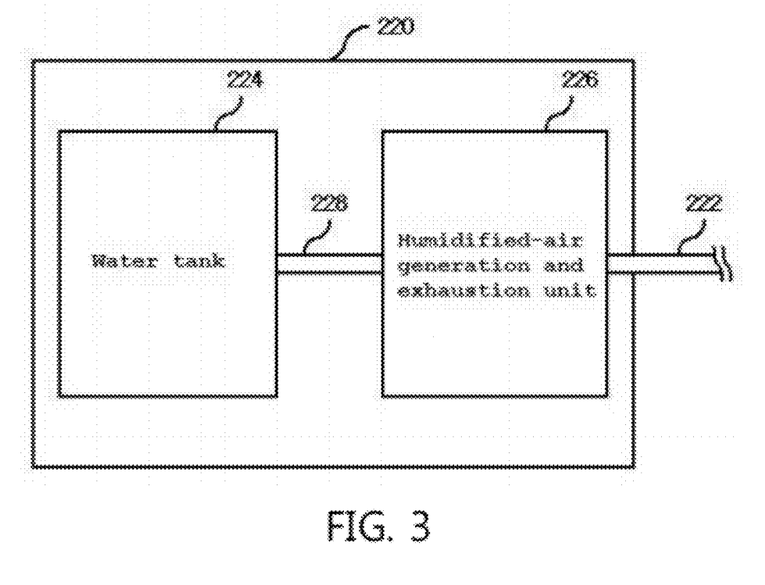
FIG. 3 is a block diagram briefly showing the configuration of a humidified-air supply unit according to an embodiment of the present invention.

In the embodiment of the present invention, the humidified-air supply unit 220 includes the humidified-air supply hole 222, a water tank 224, a humidified-air generation and exhaustion unit 226, and a water supply pipe 228.

The water tank 224 stores water needed for generating humidified air by the humidified-air generation and exhaustion unit 226 described below.

The humidified-air generation and exhaustion unit 226 generates humidified air using the water supplied from the water tank 224 and exhausts the humidified air through the humidified-air supply hole 222. Although it is not shown in FIG. 3, the humidified-air generation and exhaustion unit 226 may include an evaporation unit for evaporating the water and a fan motor for exhausting the humidified air through the humidified-air supply hole 222.

Figure 4:
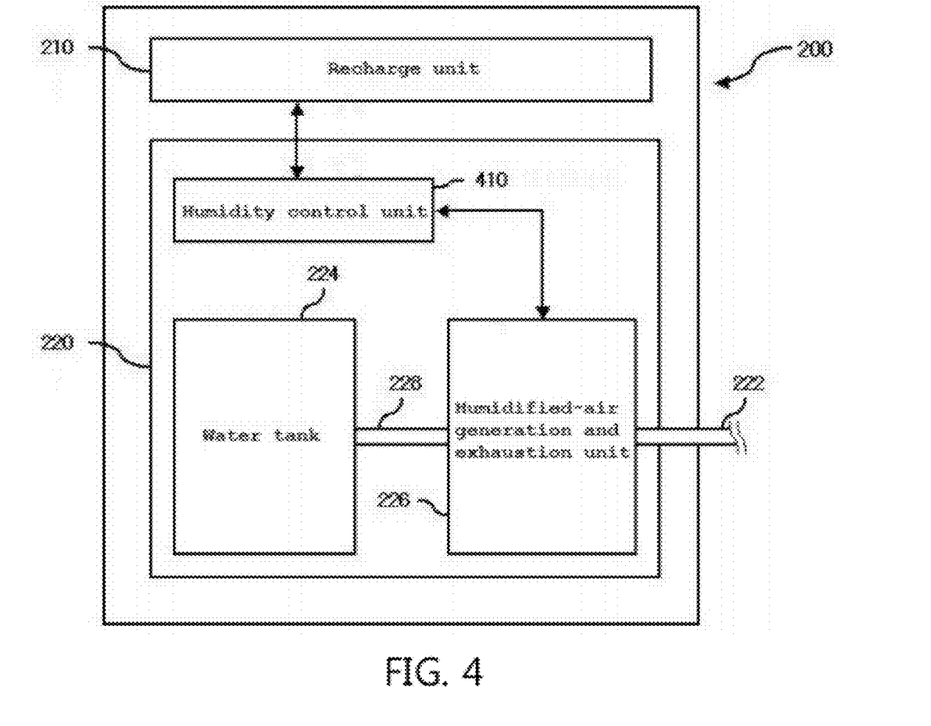
FIG. 4 is a block diagram briefly showing the configuration of a humidified-air supply unit further comprising a humidity control unit according to an embodiment of the present invention.

Meanwhile, the humidified-air supply unit 220 according to an embodiment of the present invention may further include a humidity control unit 410 for controlling humidity of the humidified air generated by the humidified-air generation and exhaustion unit 226 depending on a degree of hardness of the anode gel as shown in FIG. 4. Here, the degree of hardness of the anode gel may be known through the amount of supply current supplied by the recharge unit 210 to the metal-air cell assembly 600.

In other words, the higher the degree of hardness of the anode gel is, the more the amount of the supply current decreases. Accordingly, an amount of incoming current (the same as the amount of supply current) flowing into the anode gel having a different degree of hardness depending on a degree of using the metal-air cell assembly 600 is measured for each degree of usage, and an amount of incoming current corresponding to each degree of hardness may be generated as data. Therefore, the degree of hardness of the anode gel corresponding to the amount of supply current may be identified using the data.

Figure 5:
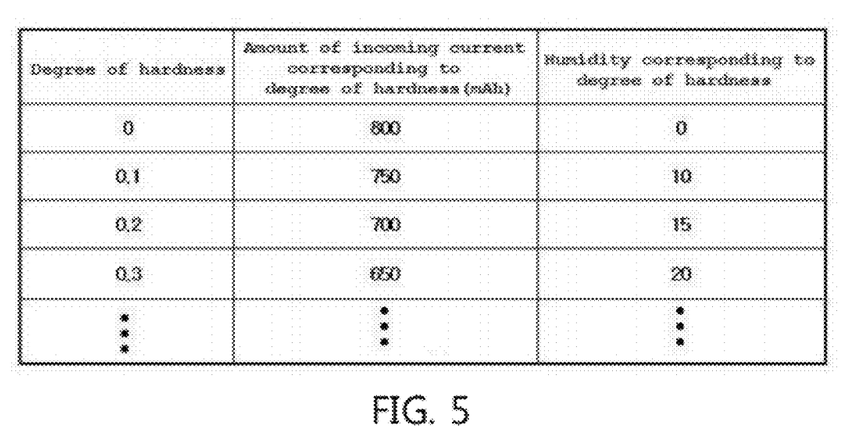
FIG. 5 is a view exemplarily showing humidity control data according to an embodiment of the present invention.

Describing in further detail, the humidity control unit 410 acquires an amount of supply current supplied by the recharge unit 210 to the metal-air cell assembly 600, from the recharge unit 210, extracts specific humidity control data corresponding to the amount of supply current from humidity control data including information on an amount of incoming current corresponding to a degree of hardness and information on humidity corresponding to the degree of hardness, as shown in FIG. 5, and controls humidity of the humidified air generated by the humidified-air generation and exhaustion unit 226 using the information on humidity included in the specific humidity control data.

In other words, the humidity control unit 410 controls the humidified-air generation and exhaustion unit 226 based on the information on humidity, and thus the humidified-air generation and exhaustion unit 226 may humidify the air to humidity corresponding to the information on humidity.

Figure 6:
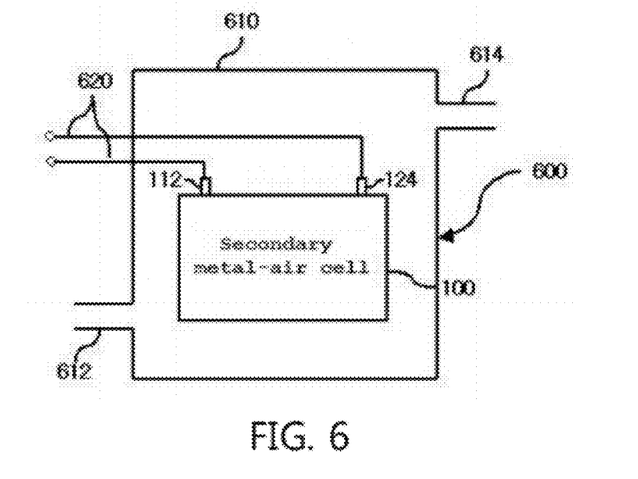
FIG. 6 is a block diagram briefly showing the configuration of a metal-air cell assembly according to an embodiment of the present invention.

FIG. 6 is a block diagram briefly showing the configuration of a metal-air cell assembly according to an embodiment of the present invention.

The metal-air cell assembly 600 according to an embodiment of the present invention includes a case 610, a power receive and feed unit 620, and a secondary metal-air cell 100. Here, since the configuration of the secondary metal-air cell 100 is described above already, details thereof will not be described.

The case 610 shapes an appearance of the metal-air cell assembly 600, has an accommodation space for accommodating the secondary metal-air cell 100 therein, forms an inlet 612 for taking in outside air or humidified air containing a certain amount of moisture on one side, and forms an outlet 614 for exhausting the outside air or the humidified air taken into the metal-air cell assembly 600 on the other side. Here, it is apparent that the humidified air is supplied by the metal-air cell recharge apparatus 200 described above.

The case 610 accommodates the secondary metal-air cell 100 in the accommodation space provided inside the case 610, discharges the secondary metal-air cell 100 by taking in the outside air or the humidified air inside the case 610 through the inlet 612, and exhausts the outside air or the humidified air taken inside the case 610 to the outside of the case 610 through the outlet 614.

In addition, when the secondary metal-air cell 100 accommodated in the accommodation space is recharged, humidity inside the case 610 is increased by taking the humidified air into the case 610 through the inlet 612 so that a certain amount of moisture is absorbed into the anode gel of the secondary metal-air cell 100.

Here, the case 610 may include an inlet cover (not shown) for opening and closing the inlet 612 and an outlet cover (not shown) for opening and closing the outlet 614.

Meanwhile, although it is described in FIG. 6 that the case 610 accommodates only one secondary metal-air cell 100 for the convenience of explanation, it is apparent that the case 610 may accommodate one or more secondary metal-air cells 100 when the present invention is applied in practice.

The power receive and feed unit 620 supplies an external load with discharge power of the secondary metal-air cell 100 outputted through a cathode current collector 112 and an anode current collector 124 of the secondary metal-air cell 100 described above, and delivers the supply power supplied by the metal-air cell recharge apparatus 200 to the cathode current collector 112 and the anode current collector 124.

Describing in further detail, the power receive and feed unit 620 has connectors or terminals, one ends of which are respectively connected to the cathode current collector 112 and the anode current collector 124, and the other ends of which are electrically connected to the external load or the metal-air cell recharge apparatus 200. Accordingly, the discharge power outputted from the secondary metal-air cell 100 included in the metal-air cell assembly 600 is delivered to the external load connected to the connectors or the terminals, or the supply power supplied by the metal-air cell recharge apparatus 200 connected to the connectors or the terminals is delivered to the cathode current collector 112 and the anode current collector 124 respectively connected to one ends of the connectors or the terminals. Through the configuration described above, the secondary metal-air cell 100 is recharged using the supply power received through the cathode current collector 112 and the anode current collector 124.

As described above, the metal-air cell assembly 600 according to an embodiment of the present invention takes in and exhausts the humidified air inside and outside thereof through the inlet 612 and the outlet 614 formed on the case 610 so that the humidified air may be filled in the inner space accommodating the secondary metal-air cell 100. Therefore, the anode gel of the secondary metal-air cell 100 in the process of hardening by repetitive discharge and recharge may be softened again by absorbing an appropriate amount of moisture from the humidified air filled in the inner space of the case 610.

Details thereof will be described with reference to FIG. 7.

Figure 7:
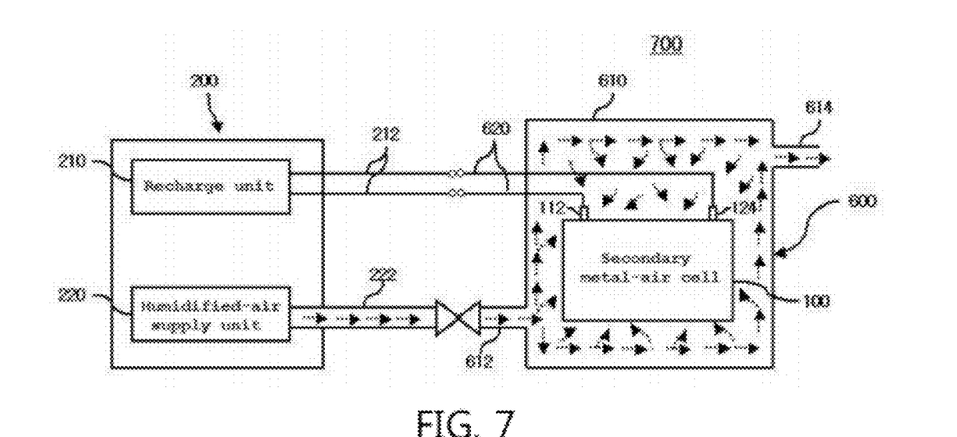
FIG. 7 is a block diagram briefly showing the configuration of a metal-air cell recharge system according to an embodiment of the present invention.

FIG. 7 is a block diagram briefly showing the configuration of a metal-air cell recharge system according to an embodiment of the present invention.

The metal-air cell recharge system 700 according to an embodiment of the present invention includes a metal-air cell assembly 600 and a metal-air cell recharge apparatus 200. As described above, the metal-air cell assembly 600 includes a secondary metal-air cell 100 having anode gel, a cathode current collector 112 and an anode current collector 124; a case 610 having an accommodation space for accommodating the secondary metal-air cell 100 therein, forming an inlet 612 on one side, and forming an outlet 614 on the other side; and a power receive and feed unit 620 for supplying an external load with discharge power outputted through the cathode current collector 112 and the anode current collector 124 and delivering supply power for recharging the secondary metal-air cell 100 to the cathode current collector 112 and the anode current collector 124. The metal-air cell recharge apparatus 200 includes a recharge unit 210 for generating supply power and supplying the metal-air cell assembly 600 with the supply power, and a humidified-air supply unit 220 for generating humidified air containing a certain amount of moisture and supplying the inlet 612 with the humidified air through a humidified-air supply hole 222.

In the metal-air cell recharge system 700 described above, the recharge unit 210 of the metal-air cell recharge apparatus 200 connects to the power receive and feed unit 620 of the metal-air cell assembly 600 through power supply lines 212 and delivers the supply power to the power receive and feed unit 620, and the secondary metal-air cell 100 included in metal-air cell assembly 600 is recharged by the supply power delivered through the power receive and feed unit 620.

Meanwhile, the humidified-air supply unit 220 of the metal-air cell recharge apparatus 200 is connected to an inlet 612 of the metal-air cell assembly 600 through the humidified-air supply hole 222 and delivers the humidified air containing a certain amount of moisture to the inlet 612.

The humidified air delivered inside the case 610 of the metal-air cell assembly 600 through the inlet 612 is uniformly filled inside the case 610 like the arrows shown in FIG. 7 and exhausted to the outside of the case 610 through the outlet 614.

If humidified air is filled inside the case 610 of the metal-air cell assembly 600 as described above when the metal-air cell assembly 600 is recharged, the anode gel of the secondary metal-air cell 100 in the process of hardening by repetitive discharge and recharge is softened by absorbing the moisture contained in the humidified air, and thus lifespan of the secondary metal-air cell 100 can be extended longer than before.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

It should be understood that the inventive concept of the present invention should not be limited to the exemplary embodiments described herein, and the inventive concept should include not only the claims but also other similar features or aspects in other embodiments.

The invention claimed is:

1. A metal-air cell recharge apparatus for recharging a metal-air cell assembly including a secondary metal-air cell containing anode gel and a case accommodating the secondary metal-air cell therein, the apparatus comprising:
    a recharge unit for generating supply power using an external power source and supplying the metal-air cell assembly with the supply power; and
    a humidified-air supply unit for generating humidified air containing a certain amount of moisture and supplying the humidified air inside the case through a humidified-air supply hole connected to the metal-air cell assembly, the humidified-air supply unit comprising a humidity control unit storing humidity control data including information on an amount of incoming current corresponding to a degree of hardness of the anode gel and information on humidity corresponding to the degree of hardness.

2. The apparatus according to claim 1, further comprising a switch capable of selectively operating either or both of the recharge unit and the humidified-air supply unit.

3. The apparatus according to claim 1, wherein the humidified-air supply unit comprises:
    a water tank for storing water needed for generating the humidified air; and
    a humidified-air generation and exhaustion unit for generating the humidified air using the water supplied from the water tank and exhausting the humidified air through the humidified-air supply hole.

4. The apparatus according to claim 3, wherein the humidity control unit controls humidity of the humidified air generated by the humidified-air generation and exhaustion unit.

5. The apparatus according to claim 1, wherein the humidity control unit acquires an amount of supply current supplied by the recharge unit to the metal-air cell assembly, from the recharge unit, extracts specific humidity control data corresponding to the amount of supply current from the humidity control data, and controls humidity of the humidified air generated by the humidified-air generation and exhaustion unit using the information on humidity included in the specific humidity control data.

6. A metal-air cell assembly including a secondary metal-air cell containing anode gel, a cathode current collector and an anode current collector, the assembly comprising:
   a case shaping an appearance of the metal-air cell assembly, the case having an accommodation space for accommodating the secondary metal-air cell therein, an inlet on one side, and an outlet on the other side; and
   a power receive and feed unit for supplying an external load with discharge power outputted through the cathode current collector and the anode current collector, and receiving supply power for recharging the secondary metal-air cell from the metal-air cell recharge apparatus of claim 1 and delivering the supply power to the cathode current collector and the anode current collector.

7. The assembly according to claim 6, wherein the case comprises an inlet cover for opening and closing the inlet and an outlet cover for opening and closing the outlet.

8. The assembly according to claim 6, wherein the case accommodates one or more secondary metal-air cells.

9. The assembly according to claim 6, wherein the power receive and feed unit has connectors or terminals, one ends of which are respectively connected to the cathode current collector and the anode current collector, and the other ends of which are electrically connected to the external load or the metal-air cell recharge apparatus.

10. A metal-air cell recharge system comprising:
a metal-air cell assembly comprising:
   a secondary metal-air cell having anode gel, a cathode current collector and an anode current collector;
   a case having an accommodation space for accommodating the secondary metal-air cell therein, an inlet on one side, and an outlet on the other side; and
   a power receive and feed unit for supplying an external load with discharge power outputted through the cathode current collector and the anode current collector and delivering supply power for recharging the secondary metal-air cell to the cathode current collector and the anode current collector; and
a metal-air cell recharge apparatus comprising:
   a recharge unit for generating the supply power and supplying the metal-air cell assembly with the supply power; and
   a humidified-air supply unit for generating humidified air containing a certain amount of moisture and supplying the inlet with the humidified air through a humidified-air supply hole, wherein the humidified-air supply unit comprises a humidity control unit storing humidity control data including information on an amount of incoming current corresponding to a degree of hardness of the anode gel and information on humidity corresponding to the degree of hardness.

11. The system according to claim 10, further comprising a switch capable of selectively operating either or both of the recharge unit and the humidified-air supply unit.

* * * * *